United States Patent
Isoyama et al.

(10) Patent No.: US 12,413,611 B2
(45) Date of Patent: Sep. 9, 2025

(54) TRANSMISSION APPARATUS, RECEPTION APPARATUS, CONTAINER TRANSMISSION SYSTEM, METHOD, AND PROGRAM

(71) Applicant: NEC Corporation, Tokyo (JP)

(72) Inventors: Kazuhiko Isoyama, Tokyo (JP); Yoshiaki Sakae, Tokyo (JP); Jun Nishioka, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 271 days.

(21) Appl. No.: 18/010,962

(22) PCT Filed: Jun. 22, 2020

(86) PCT No.: PCT/JP2020/024316
§ 371 (c)(1),
(2) Date: Dec. 16, 2022

(87) PCT Pub. No.: WO2021/260753
PCT Pub. Date: Dec. 30, 2021

(65) Prior Publication Data
US 2023/0224319 A1    Jul. 13, 2023

(51) Int. Cl.
*G06F 21/00* (2013.01)
*G06F 9/455* (2018.01)
*H04L 9/40* (2022.01)

(52) U.S. Cl.
CPC ...... *H04L 63/1433* (2013.01); *G06F 9/45558* (2013.01); *G06F 2009/45587* (2013.01)

(58) Field of Classification Search
CPC ............. H04L 63/1433; G06F 9/45558; G06F 2009/45587; G06F 21/57
See application file for complete search history.

(56) References Cited

U.S. PATENT DOCUMENTS 10,235,527 B1 * 3/2019 Dalessio ............. G06F 16/2379
10,514,905 B1   12/2019 Montgomery et al.
(Continued)

FOREIGN PATENT DOCUMENTS

| JP | 2005-517220 A | 6/2005 |
| JP | 2015-084006 A | 4/2015 |

(Continued)

OTHER PUBLICATIONS

JP Office Action for JP Application No. 2022-531246, mailed on Feb. 6, 2024 with English Translation.
(Continued)

*Primary Examiner* — Ghazal B Shehni

(57) ABSTRACT

In order to appropriately provide information related to vulnerability that may be included in a container as a transmission target, a transmission apparatus includes an information obtaining unit configured to obtain information related to a change-prohibited region included in a container to be transmitted, information indicating that the change-prohibited region has not been changed, and information related to vulnerability inspection for the change-prohibited region, and a transmission processing unit configured to include, in the container, the information related to the change-prohibited region, the information indicating that the change-prohibited region has not been changed, and the information related to the vulnerability inspection for the change-prohibited region, and transmit the container.

14 Claims, 13 Drawing Sheets

(56) References Cited

U.S. PATENT DOCUMENTS

| | | | |
|---|---|---|---|
| 2002/0183056 | A1 | 12/2002 | Lundblade et al. |
| 2017/0187540 | A1 | 6/2017 | Stopel et al. |
| 2017/0372072 | A1 | 12/2017 | Baset et al. |
| 2018/0293374 | A1* | 10/2018 | Chen .................. G06F 9/45558 |
| 2019/0243972 | A1* | 8/2019 | Krylov .................. G06N 20/00 |
| 2020/0076854 | A1* | 3/2020 | Suneja .................. G06F 9/455 |
| 2020/0117807 | A1 | 4/2020 | Nadgowda et al. |
| 2021/0133312 | A1* | 5/2021 | Sugandhi .............. H04L 9/3236 |

FOREIGN PATENT DOCUMENTS

| | | |
|---|---|---|
| JP | 2019-056986 A | 4/2019 |
| JP | 2019-525287 A | 9/2019 |

OTHER PUBLICATIONS

International Search Report for PCT Application No. PCT/JP2020/024316, mailed on Sep. 15, 2020.

JP Office Action for JP Application No. 2024-062472, mailed on Nov. 26, 2024 with English Translation.

\* cited by examiner

```
<SECURE SBOM>
    <SECURE PATH>
        <PATH> aaa.lib </PATH>
        <PATH> bbb.lib </PATH>
        <PATH> app.exe </PATH>
        <PATH> app.cnf </PATH>
        <HASH> HASH INFORMATION (DIRECT WRITING or LINK) </HASH>
        <SIGNATURE> SIGNATURE INFORMATION (DIRECT WRITING or LINK) </SIGNATURE>
    </SECURE PATH>
    <VULNERABILITY INFORMATION LIST>
        <VULNERABILITY INFORMATION>
            <INSPECTION TOOL INFORMATION>
                <TOOL NAME> aaaa </TOOL NAME>
                <TOOL CERTIFICATION INFORMATION> CERTIFICATE INFORMATION (DIRECT WRITING or LINK) e URL (IN CASE OF CLOUD) </TOOL
CERTIFICATION INFORMATION>
                <INSPECTION TARGET>
                    <INSPECTION TARGET> e.g. "exe" </INSPECTION TARGET>
                    <VULNERABILITY INDIVIDUAL INFORMATION>
                        <POSITION IDENTIFICATION INFORMATION> Lib NAME, App NAME, API NAME, OS SETTING NAME (PORT, Reg, etc.) </POSITION
IDENTIFICATION INFORMATION>
                        <VULNERABILITY TYPE> SEVERITY, CONTROLLABILITY, TYPE (MEMORY XXX, COMMUNICATION XXX), etc. </VULNERABILITY TYPE>
                        <PARAMETER INFORMATION>
                            <PARAMETER NAME> PARAMETER NAME </PARAMETER NAME>
                            <ACCEPTED PARAMETER CONDITION> ACCEPTED PARAMETER RANGE etc. </ACCEPTED PARAMETER CONDITION>
                            <UNACCEPTED PARAMETER CONDITION> UNACCEPTED PARAMETER RANGE etc. </UNACCEPTED PARAMETER CONDITION>
                        </PARAMETER INFORMATION>
                    </VULNERABILITY INDIVIDUAL INFORMATION>
                </VULNERABILITY INFORMATION>
                <INSPECTION TOOL INFORMATION>
                    <TOOL NAME> bbbb </TOOL NAME>
                    ...
                </VULNERABILITY INFORMATION>
    </VULNERABILITY INFORMATION LIST>
</SECURE SBOM>
```

Fig. 8

TRANSMISSION APPARATUS, RECEPTION APPARATUS, CONTAINER TRANSMISSION SYSTEM, METHOD, AND PROGRAM

This application is a National Stage Entry of PCT/JP2020/024316 filed on Jun. 22, 2020, the contents of all of which are incorporated herein by reference, in their entirety.

TECHNICAL FIELD

The present invention relates to a transmission apparatus, a reception apparatus, a container transmission system, a method, and a program for transmission of a container.

BACKGROUND ART

With a software supply chain becoming complicated, there have been more disadvantageous possibilities that vulnerability is incorporated into developed and containerized software owing to various factors.

As such factors, for example, a third party library, OS and NW configurations, a container being a finished product combining these, vulnerability due to the container, and the like are assumed.

For example, PTL 1 provides description of: analyzing a batch job of a container deployed in a production server in a batch job analyzation unit to identify a container image to be used; and referring to an external vulnerability information database to determine whether the container image has vulnerability registered in the database.

PTL 2 provides description of: determining, for each library, whether the library poses a security concern; extracting a set of features of each application and storing the set of the features of each application in an index table of a database; comparing the set of the features of each application and a set of features in the index table of the library to identify which library is associated with the application; and storing, for each application, a name of the application and a name of the associated library in a vulnerability reference table.

CITATION LIST

Patent Literature

[PTL 1] JP 2019-056986 A
[PTL 2] JP 2019-525287 T

SUMMARY

Technical Problem

However, in the techniques disclosed in the literatures described above, validity of the entire container image is merely ensured. Thus, for example, there is an issue in that, when a secondary developer makes alterations to the container image and changes to configurations of parameters thereof, to what extent security of the container image is ensured cannot be determined.

An example object of the present invention is to provide a transmission apparatus, a reception apparatus, a container transmission system, a method, and a program that enables appropriate provision of information related to vulnerability that may be included in a container as a transmission target.

Solution to Problem

According to one aspect of the present invention, a transmission apparatus includes: an information obtaining unit configured to obtain information related to a change-prohibited region included in a container to be transmitted, information indicating that the change-prohibited region has not been changed, and information related to vulnerability inspection for the change-prohibited region; and a transmission processing unit configured to include, in the container, the information related to the change-prohibited region, the information indicating that the change-prohibited region has not been changed, and the information related to the vulnerability inspection for the change-prohibited region, and transmit the container.

According to one aspect of the present invention, a reception apparatus includes: a reception processing unit configured to receive a container including information related to a change-prohibited region included in the container, information indicating that the change-prohibited region has not been changed, and information related to vulnerability inspection for the change-prohibited region; an information obtaining unit configured to obtain information related to the vulnerability inspection that is based on the information related to the change-prohibited region included in the container; and a verification processing unit configured to perform verification processing for the container, based on the information related to the vulnerability inspection for the change-prohibited region and the information related to the vulnerability inspection that is based on the information related to the change-prohibited region included in the container.

According to one aspect of the present invention, a container transmission system includes: a transmission apparatus configured to transmit a container including information related to a change-prohibited region included in the container to be transmitted, information indicating that the change-prohibited region has not been changed, and information related to vulnerability inspection for the change-prohibited region; and a reception apparatus configured to receive the container, and perform verification processing for the container, based on the information related to the vulnerability inspection for the change-prohibited region and the information related to the vulnerability inspection that is based on the information related to the change-prohibited region included in the container.

According to one aspect of the present invention, a method includes: obtaining information related to a change-prohibited region included in a container to be transmitted, information indicating that the change-prohibited region has not been changed, and information related to vulnerability inspection for the change-prohibited region; and including, in the container, the information related to the change-prohibited region, the information indicating that the change-prohibited region has not been changed, and the information related to the vulnerability inspection for the change-prohibited region, and transmitting the container.

According to one aspect of the present invention, a method includes: receiving a container including information related to a change-prohibited region included in the container, information indicating that the change-prohibited region has not been changed, and information related to vulnerability inspection for the change-prohibited region; obtaining information related to the vulnerability inspection that is based on the information related to the change-prohibited region included in the container; and performing verification processing for the container, based on the information related to the vulnerability inspection for the change-prohibited region and the information related to the vulnerability inspection that is based on the information related to the change-prohibited region included in the container.

According to one aspect of the present invention, a method includes: transmitting, by a transmission apparatus, a container including information related to a change-prohibited region included in the container to be transmitted, information indicating that the change-prohibited region has not been changed, and information related to vulnerability inspection for the change-prohibited region; and receiving, by a reception apparatus, the container, and performing verification processing for the container, based on the information related to the vulnerability inspection for the change-prohibited region and the information related to the vulnerability inspection that is based on the information related to the change-prohibited region included in the container.

According to one aspect of the present invention, a program is a program for causing a computer to execute: obtaining information related to a change-prohibited region included in a container to be transmitted, information indicating that the change-prohibited region has not been changed, and information related to vulnerability inspection for the change-prohibited region; and including, in the container, the information related to the change-prohibited region, the information indicating that the change-prohibited region has not been changed, and the information related to the vulnerability inspection for the change-prohibited region, and transmitting the container.

According to one aspect of the present invention, a program is a program for causing a computer to execute: receiving a container including information related to a change-prohibited region included in the container, information indicating that the change-prohibited region has not been changed, and information related to vulnerability inspection for the change-prohibited region; obtaining information related to the vulnerability inspection that is based on the information related to the change-prohibited region included in the container; and performing verification processing for the container, based on the information related to the vulnerability inspection for the change-prohibited region and the information related to the vulnerability inspection that is based on the information related to the change-prohibited region included in the container.

ADVANTAGEOUS EFFECTS OF INVENTION

According to one aspect of the present invention, information related to vulnerability that may be included in a container as a transmission target can be appropriately provided. Note that, according to the present invention, instead of or together with the above effects, other effects may be exerted.

BRIEF DESCRIPTION OF THE DRAWINGS

FIG. 8 is a diagram illustrating a specific example of various pieces of information described in an SBOM;

DESCRIPTION OF THE EXAMPLE EMBODIMENTS

Figure 1:
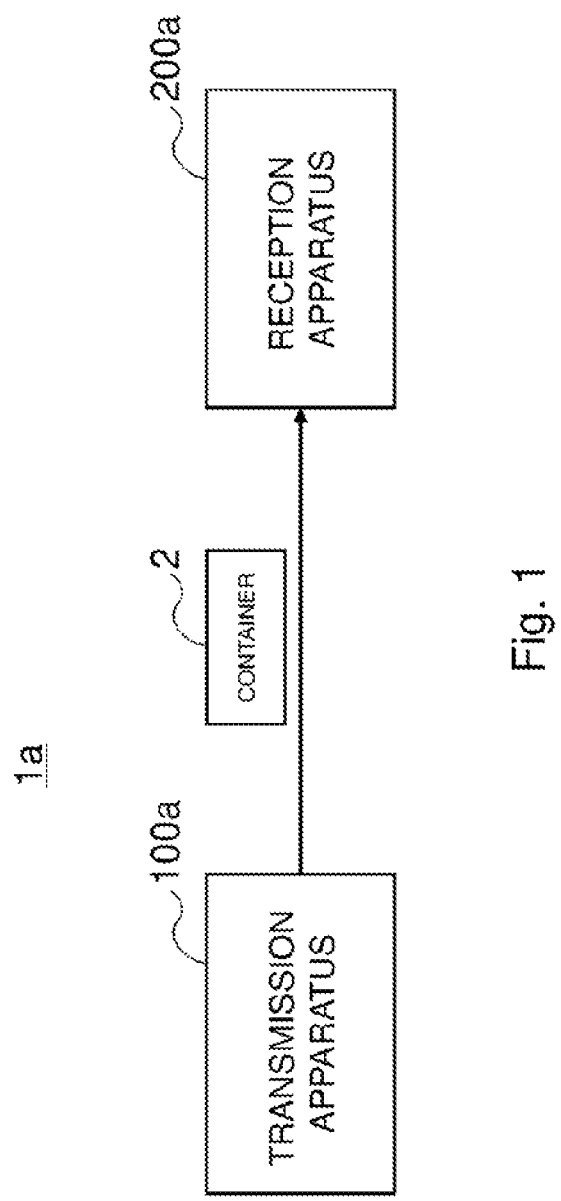
FIG. 1 is a block diagram illustrating an example of a schematic configuration of a container transmission system 1a according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of Present Invention
2. First Example Embodiment
2.1. Configuration of Container Transmission System 1a
2.2. Configuration of Transmission Apparatus 100a
2.3. Configuration of Reception Apparatus 200a
2.4. Operation Example
2.5. Example Alterations
3. Second Example Embodiment
3.1. Configuration of Transmission Apparatus 100b
3.2. Configuration of Reception Apparatus 200b
3.3. Operation Example
4. Other Example Embodiments 1. Overview of Example Embodiments of Present Invention First, an overview of example embodiments of the present invention will be described.
(1) Technical Issue With a software supply chain becoming complicated, there have been more disadvantageous possibilities that vulnerability is incorporated into developed and containerized software owing to various factors.

As such factors, for example, a third party library, OS and NW configurations, a container being a finished product combining these, vulnerability due to the container, and the like are assumed.

For example, PTL 1 above provides description of: analyzing a batch job of a container deployed in a production server in a batch job analyzation unit to identify a container image to be used; and referring to an external vulnerability information database to determine whether the container image has vulnerability registered in the database.

PTL 2 above provides description of: determining, for each library, whether the library poses a security concern; extracting a set of features of each application and storing the set of the features of each application in an index table of a database; comparing the set of the features of each application and a set of features in the index table of the library to identify which library is associated with the application; and storing, for each application, a name of the application and a name of the associated library in a vulnerability reference table.

However, in the techniques disclosed in the literatures described above, validity of the entire container image is merely ensured. Thus, for example, there is an issue in that, when a secondary developer makes alterations to the container image and changes to configurations of parameters thereof, to what extent security of the container image is ensured cannot be determined. More specifically, there is an issue in that the secondary developer cannot re-develop the containerized software while ensuring security.

In view of this, the present example embodiments have an example object to appropriately provide information related to vulnerability that may be included in a container as a transmission target.

(2) Technical Features

In an example embodiment of the present invention, a transmission apparatus obtains information related to a change-prohibited region included in a container to be transmitted, information indicating that the change-prohibited region has not been changed, and information related to vulnerability inspection for the change-prohibited region, and includes, in the container, the information related to the change-prohibited region, the information indicating that the change-prohibited region has not been changed, and the information related to the vulnerability inspection for the change-prohibited region, and transmits the container.

In an example embodiment of the present invention, a reception apparatus receives a container including information related to a change-prohibited region included in the container, information indicating that the change-prohibited region has not been changed, and information related to vulnerability inspection for the change-prohibited region, obtains information related to the vulnerability inspection that is based on the information related to the change-prohibited region included in the container, and performs verification processing for the container, based on the information related to the vulnerability inspection for the change-prohibited region and the information related to the vulnerability inspection that is based on the information related to the change-prohibited region included in the container.

With this, for example, information related to vulnerability that may be included in a container as a transmission target can be appropriately provided. Note that the technical features described above are merely a specific example of the example embodiments of the present invention, and as a matter of course, the example embodiments of the present invention are not limited to the technical features described above.

2. First Example Embodiment

Next, with reference to FIG. 1 to FIG. 11, a first example embodiment will be described.

2.1. Configuration of Container Transmission System 1a

With reference to FIG. 1, an example of a configuration of a container transmission system 1a according to the first example embodiment will be described. FIG. 1 is a block diagram illustrating an example of a schematic configuration of the container transmission system 1a according to the first example embodiment. With reference to FIG. 1, the container transmission system 1a includes a transmission apparatus 100a that transmits a container 2, and a reception apparatus 200a that receives the container 2.

2.2. Configuration of Transmission Apparatus 100a

Figure 2:
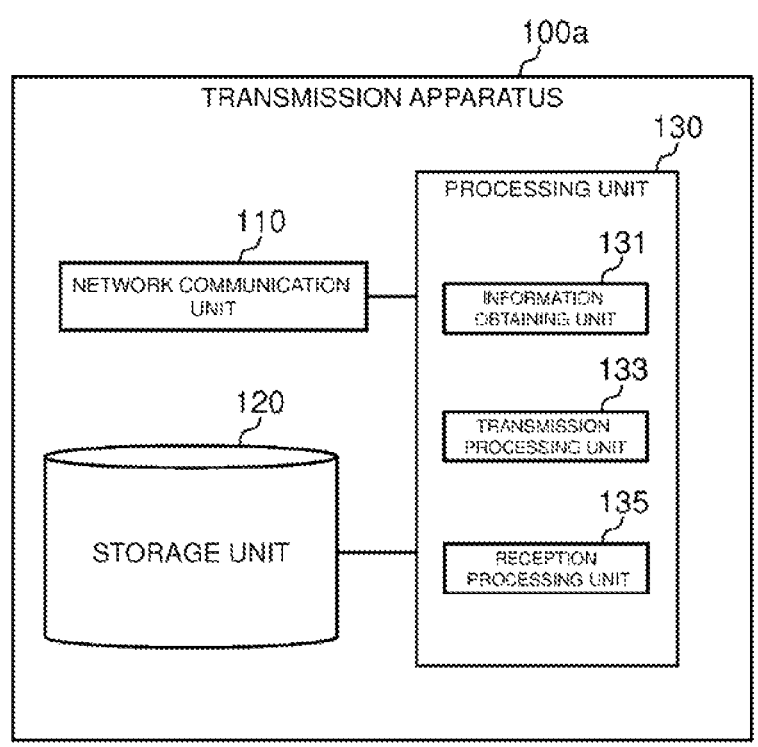
FIG. 2 is a block diagram for illustrating an example of a configuration of a transmission apparatus 100a according to the first example embodiment.

FIG. 2 is a block diagram for illustrating an example of a configuration of the transmission apparatus 100a according to the first example embodiment. With reference to FIG. 2, the transmission apparatus 100a includes a network communication unit 110, a storage unit 120, and a processing unit 130.

(1) Network Communication Unit 110

The network communication unit 110 receives a signal from a network, and transmits a signal to the network.

(2) Storage Unit 120

The storage unit 120 temporarily or permanently stores a program (instructions) and parameters for operations of the transmission apparatus 100a as well as various data. The program includes one or more instructions for the operations of the transmission apparatus 100a.

(3) Processing Unit 130

The processing unit 130 provides various functions of the transmission apparatus 100a. The processing unit 130 includes an information obtaining unit 131, a transmission processing unit 133, and a reception processing unit 135. Note that the processing unit 130 may further include constituent elements other than these constituent elements. In other words, the processing unit 130 may also perform operations other than the operations of these constituent elements. Specific operations of the information obtaining unit 131, the transmission processing unit 133, and the reception processing unit 135 will be described later in detail.

(4) Implementation Example

The network communication unit 110 may be implemented with a network adapter and/or a network interface card, and the like. The storage unit 120 may be implemented with a memory (e.g., a nonvolatile memory and/or a volatile memory) and/or a hard disk, and the like. The processing unit 130 may be implemented with one or more processors. The information obtaining unit 131, the transmission processing unit 133, and the reception processing unit 135 may be implemented with the same processor, or may be separately implemented with different processors. The memory (storage unit 120) may be included in the one or more processors or may be provided outside the one or more processors.

The transmission apparatus 100a may include a memory that stores a program (instructions), and one or more processors that can execute the program (instructions). The one or more processors may execute the program to thereby perform operations of the processing unit 130 (operations of the information obtaining unit 131, the transmission processing unit 133, and/or the reception processing unit 135). The program may be a program for causing the processor(s) to execute the operations of the processing unit 130 (the operations of the information obtaining unit 131, the transmission processing unit 133, and/or the reception processing unit 135).

2.3. Configuration of Reception Apparatus 200a

Figure 3:
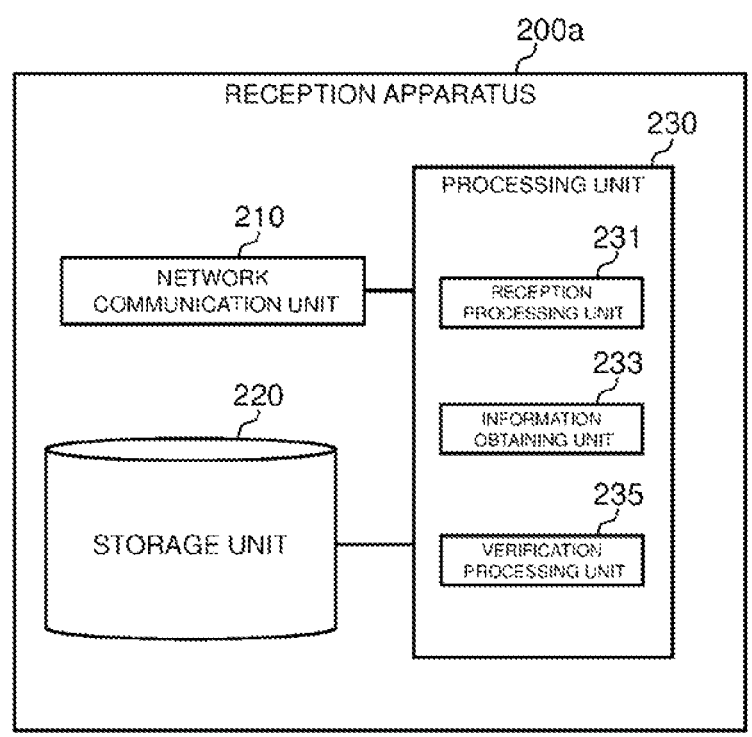
FIG. 3 is a block diagram for illustrating an example of a configuration of a reception apparatus 200a according to the first example embodiment.

FIG. 3 is a block diagram for illustrating an example of a configuration of the reception apparatus 200a according to the first example embodiment. With reference to FIG. 3, the reception apparatus 200a includes a network communication unit 210, a storage unit 220, and a processing unit 230.

(1) Network Communication Unit 210

The network communication unit 210 receives a signal from a network, and transmits a signal to the network.

(2) Storage Unit 220

The storage unit 220 temporarily or permanently stores a program (instructions) and parameters for operations of the reception apparatus 200a as well as various data. The program includes one or more instructions for the operations of the reception apparatus 200a.

(3) Processing Unit 230

The processing unit 230 provides various functions of the reception apparatus 200a. The processing unit 230 includes a reception processing unit 231, an information obtaining unit 233, and a verification processing unit 235. Note that the processing unit 230 may further include constituent elements other than these constituent elements. In other words, the processing unit 230 may also perform operations other than the operations of these constituent elements. Specific operations of the reception processing unit 231, the information obtaining unit 233, and the verification processing unit 235 will be described later in detail.

(4) Implementation Example

The network communication unit 210 may be implemented with a network adapter and/or a network interface card, and the like. The storage unit 220 may be implemented with a memory (e.g., a nonvolatile memory and/or a volatile memory) and/or a hard disk, and the like. The processing unit 230 may be implemented with one or more processors. The reception processing unit 231, the information obtaining unit 233, and the verification processing unit 235 may be implemented with the same processor, or may be separately implemented with different processors. The memory (storage unit 220) may be included in the one or more processors or may be provided outside the one or more processors.

The reception apparatus 200a may include a memory that stores a program (instructions), and one or more processors that can execute the program (instructions). The one or more processors may execute the program to thereby perform operations of the processing unit 230 (operations of the reception processing unit 231, the information obtaining unit 233, and/or the verification processing unit 235). The program may be a program for causing the processor(s) to execute the operations of the processing unit 230 (the operations of the reception processing unit 231, the information obtaining unit 233, and/or the verification processing unit 235).

2.4. Operation Example

Next, an operation example according to the first example embodiment will be described.

According to the first example embodiment, the transmission apparatus 100a (information obtaining unit 131) obtains information related to a change-prohibited region included in a container 2 to be transmitted, information indicating that the change-prohibited region has not been changed, and information related to vulnerability inspection for the change-prohibited region. The transmission apparatus 100a (transmission processing unit 133) includes, in the container 2, the information related to the change-prohibited region, the information indicating that the change-prohibited region has not been changed, and the information related to the vulnerability inspection for the change-prohibited region, and transmits the container 2.

For example, the information related to the change-prohibited region, the information indicating that the change-prohibited region has not been changed, and the information related to the vulnerability inspection for the change-prohibited region are included in the container 2 as a software bill of materials (SBOM) for the container 2.

According to the first example embodiment, the reception apparatus 200a (reception processing unit 231) receives the container 2. The reception apparatus 200a (information obtaining unit 233) obtains the information related to the vulnerability inspection that is based on the information related to the change-prohibited region included in the container 2. The reception apparatus 200a (verification processing unit 235) performs verification processing for the container 2, based on the information related to the vulnerability inspection for the change-prohibited region and the information related to the vulnerability inspection that is based on the information related to the change-prohibited region included in the container 2.

According to the first example embodiment, information related to vulnerability that may be included in a container as a transmission target can be appropriately provided. Further detailed operations will be described below.

(1) Information Related to Change-Prohibited Region

The information related to the change-prohibited region includes information for identifying a position of the change-prohibited region in the container 2. Specifically, the information for identifying the position of the change-prohibited region is path information of a directory or a folder configuring the change-prohibited region.

The information related to the change-prohibited region includes pieces of attribute information of one or more files included in the change-prohibited region. Here, each of the pieces of attribute information of one or more files may be metadata (file information) of each of the files.

Figure 4:
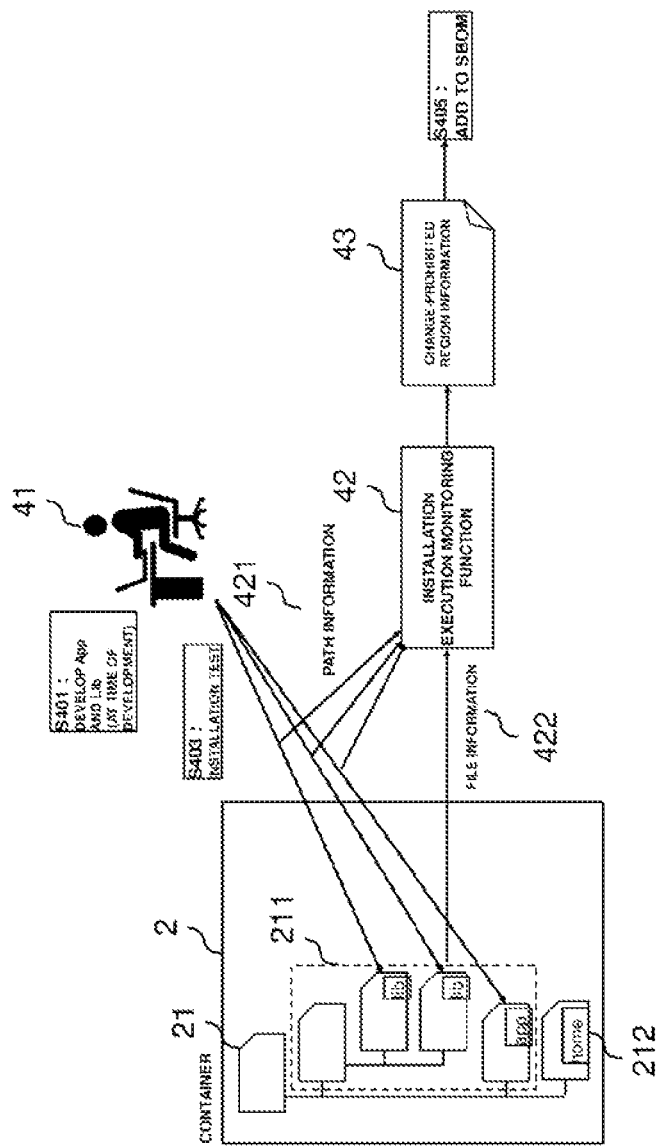
FIG. 4 is a diagram for schematically illustrating an exemplary procedure for generating information related to a change-prohibited region.

FIG. 4 is a diagram for schematically illustrating an exemplary procedure for generating the information related to the change-prohibited region.

With reference to FIG. 4, in Step S401, for example, a container developer 41 of the container 2 designates, as a change-prohibited region 211, an application developed by the developer itself and a directory and/or a folder that is not allowed to be changed in order to ensure correct operation of the library out of a root folder 21 of the container 2. Note that a directory 212 included in the root folder 21 functions as a directory that can be changed (in other words, that can be edited) by a secondary developer other than the container developer 41.

Next, in Step S403, for example, an installation execution monitoring function 42 executes an installation test for the application and the library included in the change-prohibited region 211, and extracts path information 421 that is required for installation operation and file information 422 that affects at the time of installation execution. Then, the extracted path information 421 and file information 422 are generated as change-prohibited region information 43 (which corresponds to the information related to the change-prohibited region). For example, in Step S405, the change-prohibited region information 43 is added to the SBOM for the container 2.

(2) Information Indicating that Change-Prohibited Region Has Not Been Changed

The information indicating that the change-prohibited region has not been changed includes a hash value generated from the information related to the change-prohibited region.

Figure 5:
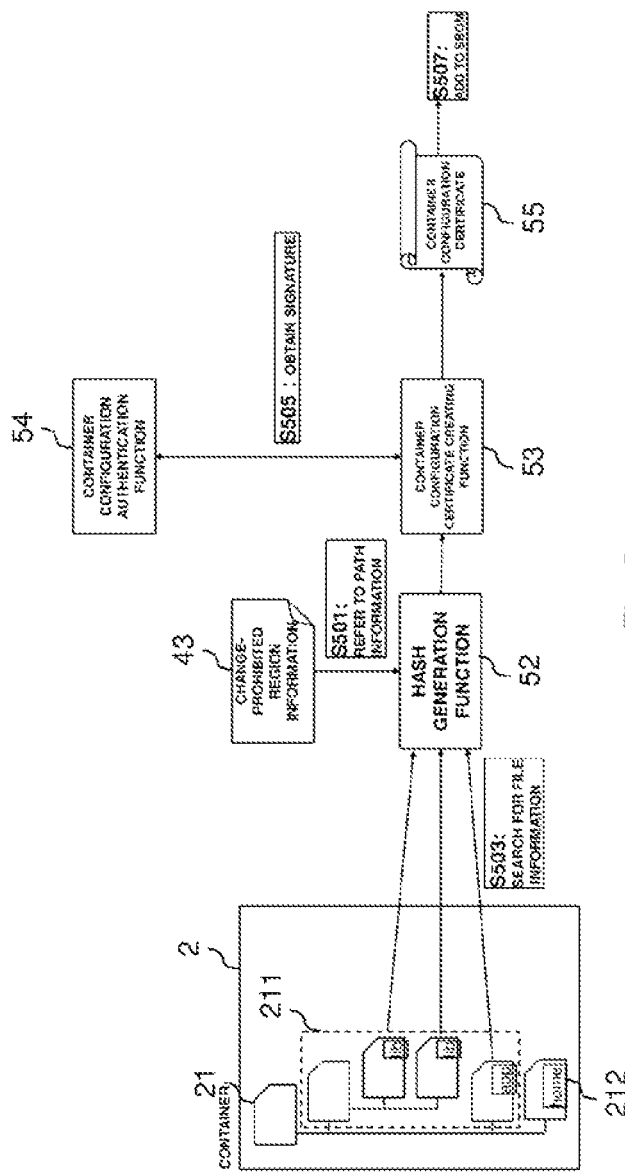
FIG. 5 is a diagram for schematically illustrating an exemplary procedure for generating information indicating that the change-prohibited region has not been changed.

FIG. 5 is a diagram for schematically illustrating an exemplary procedure for generating the information indicating that the change-prohibited region has not been changed.

With reference to FIG. 5, for example, a hash generation function 52 refers to the change-prohibited region information 43 described with reference to FIG. 4 (S501), searches the container 2 for corresponding file information (S503), and calculates a hash value, based on these pieces of information. Next, a container configuration certificate creating function 53 obtains a signature from a container configuration authentication function 54 (S505), and generates a container configuration certificate including the signed hash value. Then, the container configuration certificate is added to the SBOM (S507).

Figure 6:
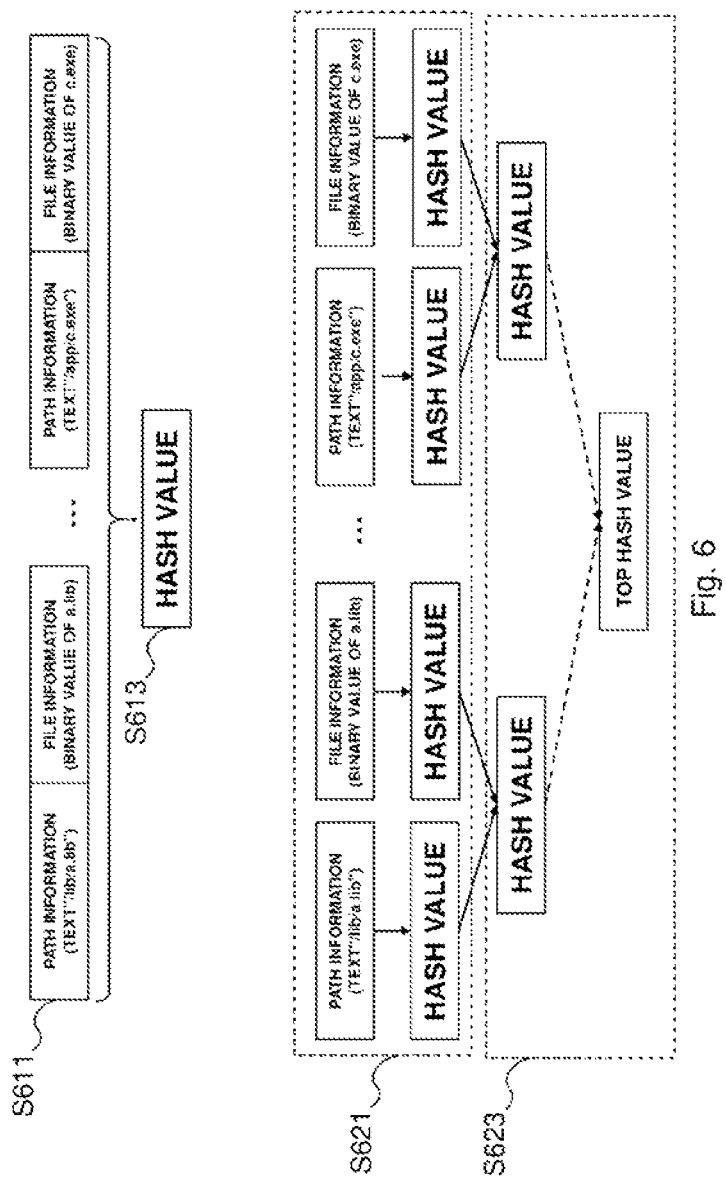
FIG. 6 is a diagram for schematically illustrating an example of a processing in which a hash generation function 52 generates a hash value.

FIG. 6 is a diagram for schematically illustrating an example of a processing in which the hash generation function 52 generates a hash value.

With reference to FIG. 6, as an example, in Step S611, a plurality of pieces of path information and a plurality of pieces of file information included in the information related to the change-prohibited region are concatenated. Next, in Step S613, a hash value is calculated using the concatenated data.

As an example of alternative processing, in Step S621, a hash value is generated from each of the pieces of path information, and a hash value is generated from each of the pieces of file information. Next, in Step S623, processing of concatenating strings of the two hash values generated in Step S621 and thereby calculating a new hash value is repeated, and a top hash value is ultimately calculated.

(3) Information Related to Vulnerability Inspection for Change-Prohibited Region The information related to the vulnerability inspection for the change-prohibited region includes information related to an inspection tool that performs vulnerability inspection of the change-prohibited region. Specifically, the information related to the inspection tool includes a tool name for identifying the inspection tool, certification information for certifying a rule, and the like.

The information related to the vulnerability inspection for the change-prohibited region includes information related to an inspection target region included in the change-prohibited region. Examples of the inspection target region include a file for performing installation or activation of an application.

Information for executing the inspection tool (file for performing installation or activation of an application for execution of the inspection tool) may be included in the container 2. In this case, the reception apparatus 200*a* (information obtaining unit 233) performs inspection for the information related to the change-prohibited region by using the inspection tool included in the container 2, and obtains the information related to the vulnerability inspection that is based on the information related to the change-prohibited region.

Furthermore, the information related to the vulnerability inspection for the change-prohibited region includes information indicating a configuration condition of a parameter related to vulnerability in the change-prohibited region (for example, accepted parameter information with which security can be ensured).

Figure 7:
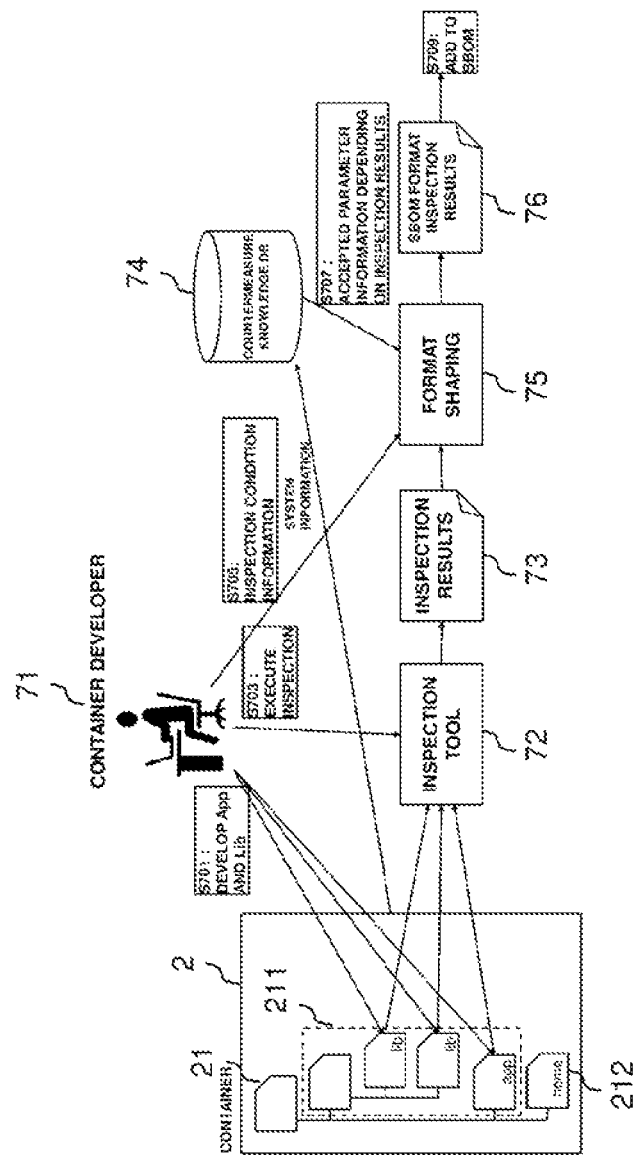
FIG. 7 is a diagram for schematically illustrating an exemplary procedure for generating information related to vulnerability inspection for the change-prohibited region.

FIG. 7 is a diagram for schematically illustrating an exemplary procedure for generating the information related to the vulnerability inspection for the change-prohibited region.

With reference to FIG. 7, in Step S701, a container developer 71 of the container 2 designates, as the change-prohibited region 211, an application developed by the developer itself and a directory and/or a folder that is not allowed to be changed in order to ensure correct operation of the library out of the root folder 21 of the container 2.

Next, in Step S703, in response to an instruction from the container developer 71, an inspection tool 72 performs vulnerability inspection for the application and the library included in the change-prohibited region 211. With this, inspection results 73 are obtained.

Next, in Step S705, the container developer 71 designates inspection condition information regarding the vulnerability inspection performed in Step S703 (for example, information related to the inspection tool, information related to the inspection target region, and the like).

In Step S707, a format shaping unit 75 refers to a countermeasure knowledge database 74 that manages security countermeasure knowledge for the container 2, and determines the accepted parameter information depending on the inspection results 73, based on system information of the container 2. Then, the format shaping unit 75 determines additional information related to the inspection results, based on the inspection condition information and the accepted parameter information.

Next, in Step S709, the additional information is added to the SBOM as SBOM format inspection results 76.

(4) Description Example of SBOM

FIG. 8 is a diagram illustrating a specific example of various pieces of information described in the SBOM.

With reference to FIG. 8, each piece of description from <PATH> to </PATH> out of description from <SECURE PATH> to </SECURE PATH> in a secure SBOM 800 corresponds to the information related to the change-prohibited region. Description from <HASH> to </HASH> in the secure SBOM 800 corresponds to the information indicating that the change-prohibited region has not been changed.

Description from <VULNERABILITY INFORMATION LIST> to </VULNERABILITY INFORMATION LIST> in the secure SBOM 800 corresponds to the information related to the vulnerability inspection for the change-prohibited region. Specifically, description from <INSPECTION TOOL INFORMATION> to </INSPECTION TOOL INFORMATION> corresponds to the information related to the inspection tool. Description from <INSPECTION TARGET> to </INSPECTION TARGET> corresponds to the information related to the inspection target region. Description from <PARAMETER INFORMATION> to out of description from <VULNERABILITY INDIVIDUAL INFORMATION> to </VULNERABILITY INDIVIDUAL INFORMATION> corresponds to the information indicating the configuration condition of the parameter related to vulnerability in the change-prohibited region.

(5) Flow of Processing

Next, a flow of processing according to the first example embodiment will be described.

(5-1) Flow of Processing According to First Specific Example

Figure 9:
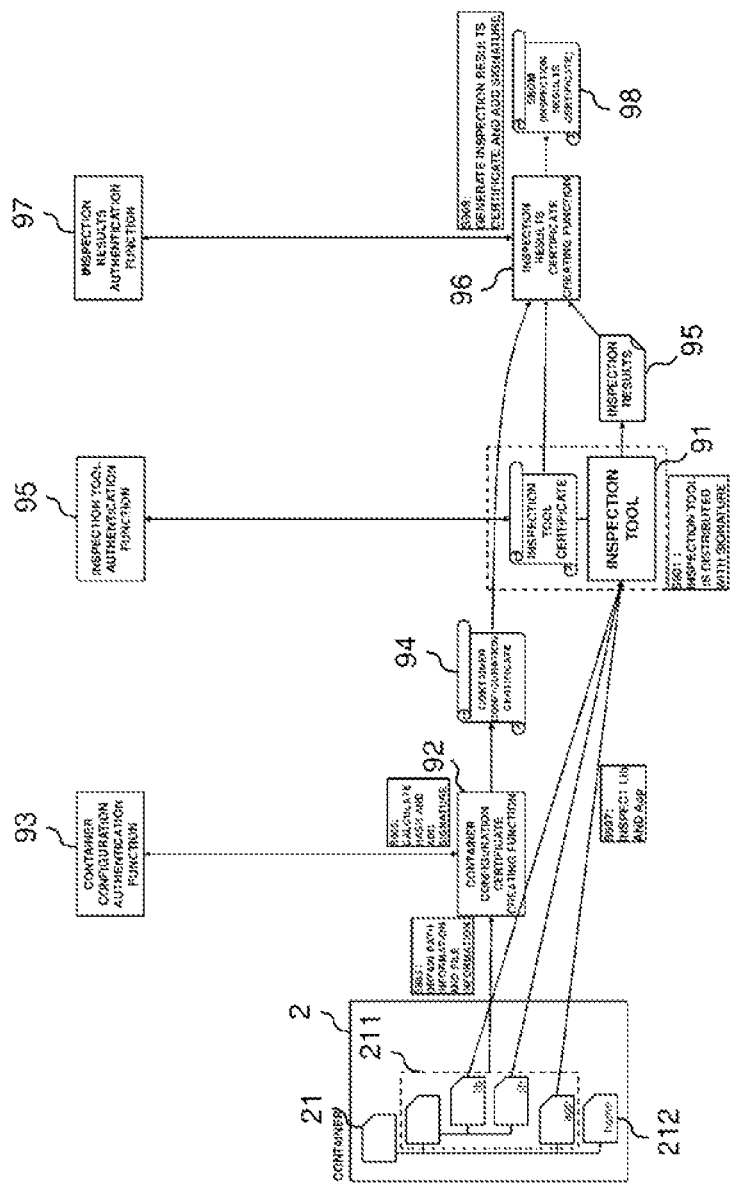
FIG. 9 is a diagram for illustrating a flow of processing according to a first specific example of the first example embodiment.

FIG. 9 is a diagram for illustrating a flow of processing according to a first specific example of the first example embodiment.

With reference to FIG. 9, in Step S901, an inspection tool 91 is distributed with a signature.

Next, in Step S903, a container configuration certificate creating function 92 obtains the path information and the file information included in the change-prohibited region 211. Next, in Step S905, the container configuration certificate creating function 92 calculates a hash value based on the obtained path information and file information, and adds a signature obtained from a container configuration authentication function 93 to the hash value. With this, a container configuration certificate 94 including the signed hash value is generated, and is transmitted to an inspection results certificate creating function 96.

Next, in Step S907, a library Lib and an application App included in the change-prohibited region 211 are inspected using the inspection tool 91, and inspection results 95 are obtained. The inspection results 95 are transmitted to the inspection results certificate creating function 96.

Next, in Step S909, the inspection results certificate creating function 96 generates an inspection results certificate based on the inspection results 95, and adds a signature obtained from an inspection results authentication function 97 to the inspection results certificate. Then, an SBOM 98 including the inspection results certificate and the container configuration certificate 94 is generated. Subsequently, the transmission apparatus 100a transmits the container 2 to which the SBOM 98 is added to the reception apparatus 200a.

Note that, in the processing illustrated in FIG. 9, the transmission apparatus 100a (processing unit 130) may execute at least one step out of Steps S901 to S909.

(5-2) Flow of Processing According to Second Specific Example

Figure 10:
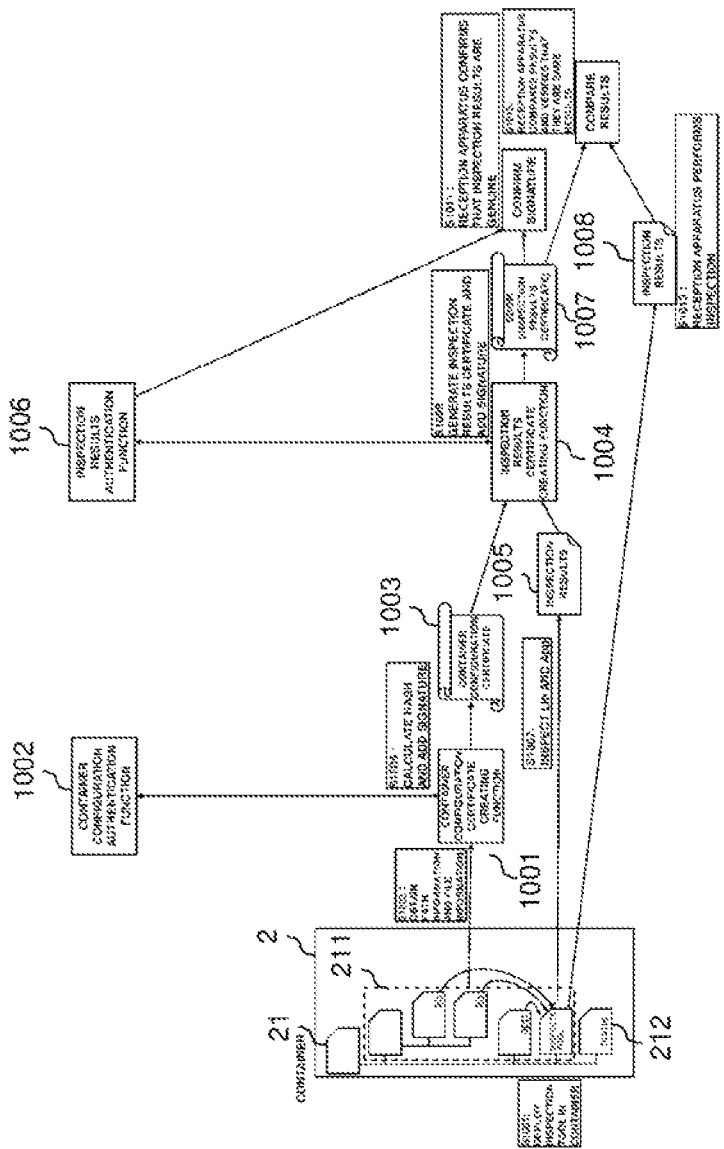
FIG. 10 is a diagram for illustrating a flow of processing according to a second specific example of the first example embodiment.

FIG. 10 is a diagram for illustrating a flow of processing according to a second specific example of the first example embodiment.

With reference to FIG. 10, in Step S1001, information for executing the inspection tool is deployed in the container 2.

Next, in Step S1003, a container configuration certificate creating function 1001 obtains path information and file information included in the change-prohibited region 211. Next, in Step S1005, the container configuration certificate creating function 1001 calculates a hash value based on the obtained path information and file information, and adds a signature obtained from a container configuration authentication function 1002 to the hash value. With this, a container configuration certificate 1003 including the signed hash value is generated, and is transmitted to an inspection results certificate creating function 1004.

Next, in Step S1007, a library Lib and an application App included in the change-prohibited region 211 are inspected using the inspection tool deployed in the change-prohibited region 211, and inspection results 1005 are obtained. The inspection results 1005 are transmitted to the inspection results certificate creating function 1004.

Next, in Step S1009, the inspection results certificate creating function 1004 generates an inspection results certificate based on the inspection results 1005, and adds a signature obtained from an inspection results authentication function 1006 to the inspection results certificate. Then, an SBOM 1007 including the inspection results certificate and the container configuration certificate 1003 is generated, and is transmitted to the transmission apparatus 100a. Subsequently, the transmission apparatus 100a transmits the container 2 to which the SBOM 1007 is added to the reception apparatus 200a.

Next, in Step S1011, the reception apparatus 200a accesses the inspection results authentication function 1006, and thereby confirms that the inspection results certificate included in the SBOM 1007 is genuine.

Next, in Step S1013, the reception apparatus 200a inspects the library Lib and the application App included in the change-prohibited region 211 by using the inspection tool included in the container 2, and obtains inspection results 1008.

Next, in Step S1015, the reception apparatus 200a compares the inspection results 1005 indicated by the inspection results certificate included in the SBOM 1007 and the inspection results 1008 obtained by using the inspection tool, and verifies that they are the same inspection results.

Note that, in the processing illustrated in FIG. 10, the transmission apparatus 100a (processing unit 130) may execute at least one step out of Steps S1001 to S1009.

(6) Summary

As described above, according to the first example embodiment, the information related to the change-prohibited region and the information indicating that the change-prohibited region has not been changed are included in the container 2, and therefore a receiver side (reception apparatus 200a) of the container 2 can determine where the region (for example, the change-prohibited region 211) with ensured security is in the container 2.

According to the first example embodiment, the information related to the vulnerability inspection for the change-prohibited region is included in the container 2, and therefore the reception apparatus 200a can determine how security is ensured in the change-prohibited region 211.

2.5. Example Alterations

The first example embodiment is not limited to the operation example described above, and various alterations can be made thereto.

For example, before transmitting the container 2, the transmission apparatus 100a (transmission processing unit 133) may transmit the information related to the change-prohibited region to a computing system (for example, a cloud service) that performs vulnerability inspection via a communication network (for example, the Internet). In this case, before transmitting the container 2, the transmission apparatus 100a (reception processing unit 135) receives the information related to the vulnerability inspection for the change-prohibited region from the computing system (for example, the cloud service) that performs the vulnerability inspection via the communication network (for example, the Internet).

Figure 11:
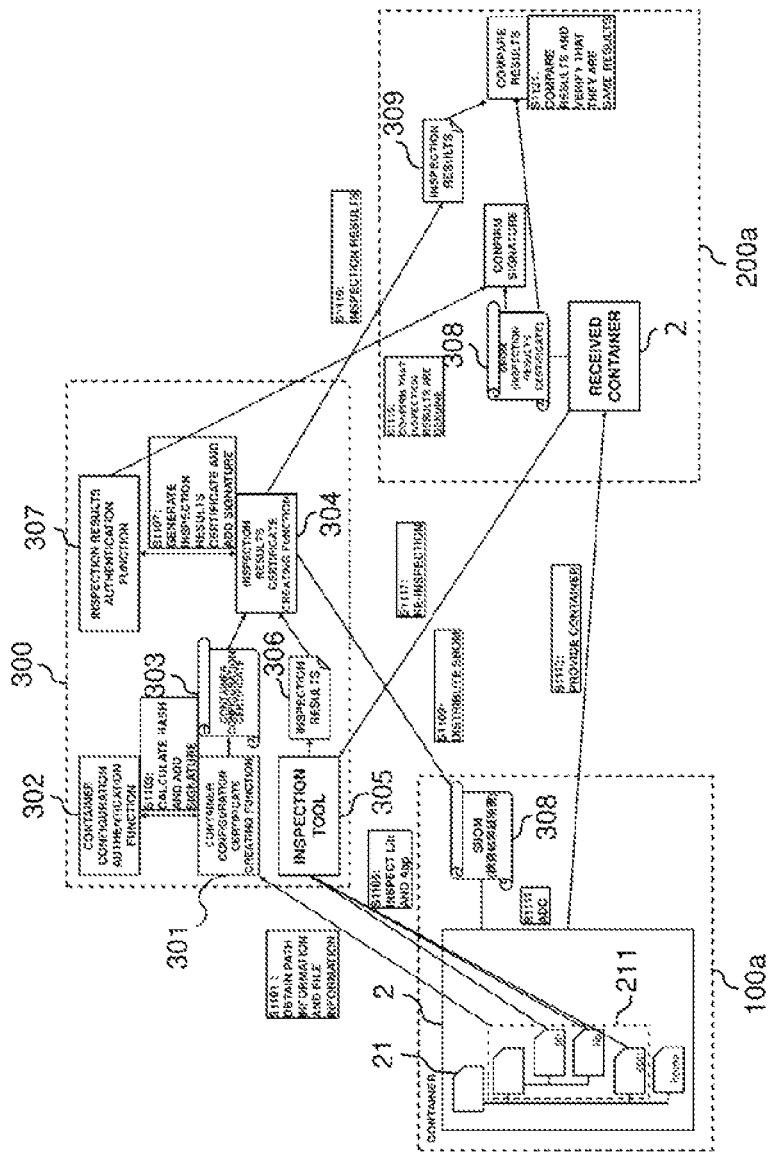
FIG. 11 is a diagram for illustrating a flow of processing according to an example alteration of the first example embodiment.

FIG. 11 is a diagram for illustrating a flow of processing according to an example alteration of the first example embodiment.

First, with reference to FIG. 11, the transmission apparatus 100a corresponding to a container provider accesses a cloud service 300 and thereby obtains an SBOM. The reception apparatus 200a corresponding to a container user accesses the cloud service 300, and thereby performs verification processing for the container 2.

Specifically, in Step S1101, in the cloud service 300, a container configuration certificate creating function 301 obtains path information and file information included in the change-prohibited region 211 from the transmission apparatus 100a.

Next, in Step S1103, in the cloud service 300, the container configuration certificate creating function 301 calculates a hash value based on the obtained path information and file information, and adds a signature obtained from a container configuration authentication function 302 included in the cloud service 300 to the hash value. With this, in the cloud service 300, a container configuration certificate 303 including the signed hash value is generated, and is transmitted to an inspection results certificate creating function 304.

Next, in Step S1105, a library Lib and an application App included in the change-prohibited region 211 are inspected using an inspection tool 305 deployed in the cloud service 300, and inspection results 306 are obtained. The inspection results 306 are transmitted to the inspection results certificate creating function 304.

Next, in Step S1107, in the cloud service 300, the inspection results certificate creating function 304 generates an inspection results certificate based on the inspection results 306, and adds a signature obtained from the inspection results authentication function 1006 to the inspection results certificate.

Next, in Step S1109, the cloud service 300 generates an SBOM 308 including the inspection results certificate and the container configuration certificate 303, and distributes the SBOM 308 to the transmission apparatus 100a.

Next, in Step S1111, the transmission apparatus 100a adds the SBOM 308 distributed from the cloud service 300 to the container 2.

Next, in Step S1113, the transmission apparatus 100a transmits the container 2 to which the SBOM 308 is added to the reception apparatus 200a via the Internet.

Next, in Step S1115, the reception apparatus 200a accesses an inspection results authentication function 307 included in the cloud service 300, and thereby confirms that the inspection results certificate included in the SBOM 308 is genuine.

Next, in Step S1117, the reception apparatus 200a accesses the cloud service 300, and transmits the change-prohibited region 211 included in the received container 2. With this, in the cloud service 300, re-inspection of the change-prohibited region 211 is performed using the inspection tool 305, and inspection results are transmitted to the inspection results certificate creating function 304.

Next, in Step S1119, the reception apparatus 200a obtains information (inspection results 309) corresponding to the inspection results 306 described above from the inspection results certificate creating function 304 included in the cloud service 300.

Next, in Step S1121, the reception apparatus 200a compares the inspection results indicated by the inspection results certificate included in the SBOM 308 and the inspection results 309 obtained from the cloud service 300, and verifies that they are the same inspection results.

According to the example alteration as illustrated in FIG. 11, the role of vulnerability inspection is performed in the cloud service 300, and therefore processing performed in the transmission apparatus 100a and the reception apparatus 200a can be reduced.

3. Second Example Embodiment

Next, with reference to FIG. 12 and FIG. 13, a second example embodiment of the present invention will be described. While the first example embodiment described above is a specific example embodiment, the second example embodiment is a more generalized example embodiment.

3.1. Configuration of Transmission Apparatus 100b

Figure 12:
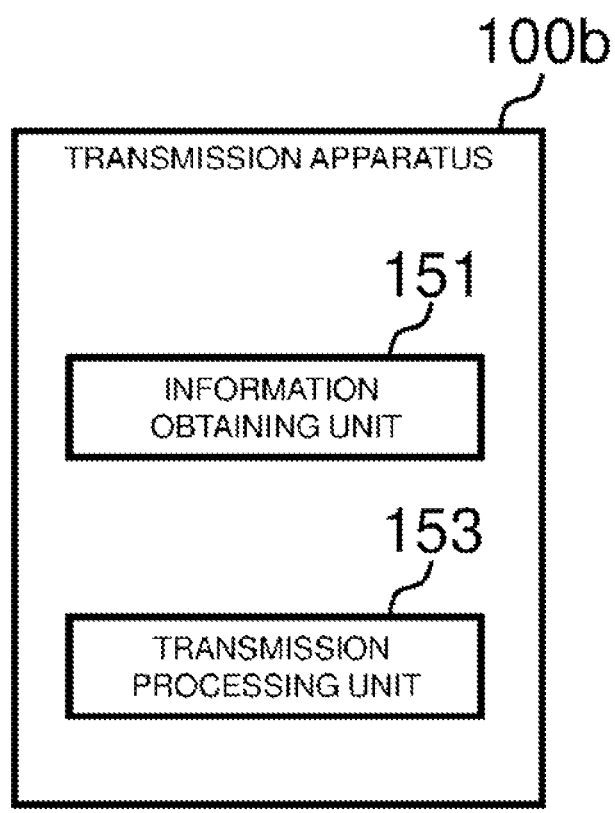
FIG. 12 is a block diagram illustrating an example of a schematic configuration of a transmission apparatus 100b according to a second example embodiment.

FIG. 12 is a block diagram illustrating an example of a schematic configuration of a transmission apparatus 100b according to the second example embodiment. With reference to FIG. 12, the transmission apparatus 100b includes an information obtaining unit 151 and a transmission processing unit 153.

The information obtaining unit 151 and the transmission processing unit 153 may be implemented with one or more processors, and a memory (e.g., a nonvolatile memory and/or a volatile memory) and/or a hard disk. The information obtaining unit 151 and the transmission processing unit 153 may be implemented with the same processor, or may be separately implemented with different processors. The memory may be included in the one or more processors or may be provided outside the one or more processors.

3.2. Configuration of Reception Apparatus 200b

Figure 13:
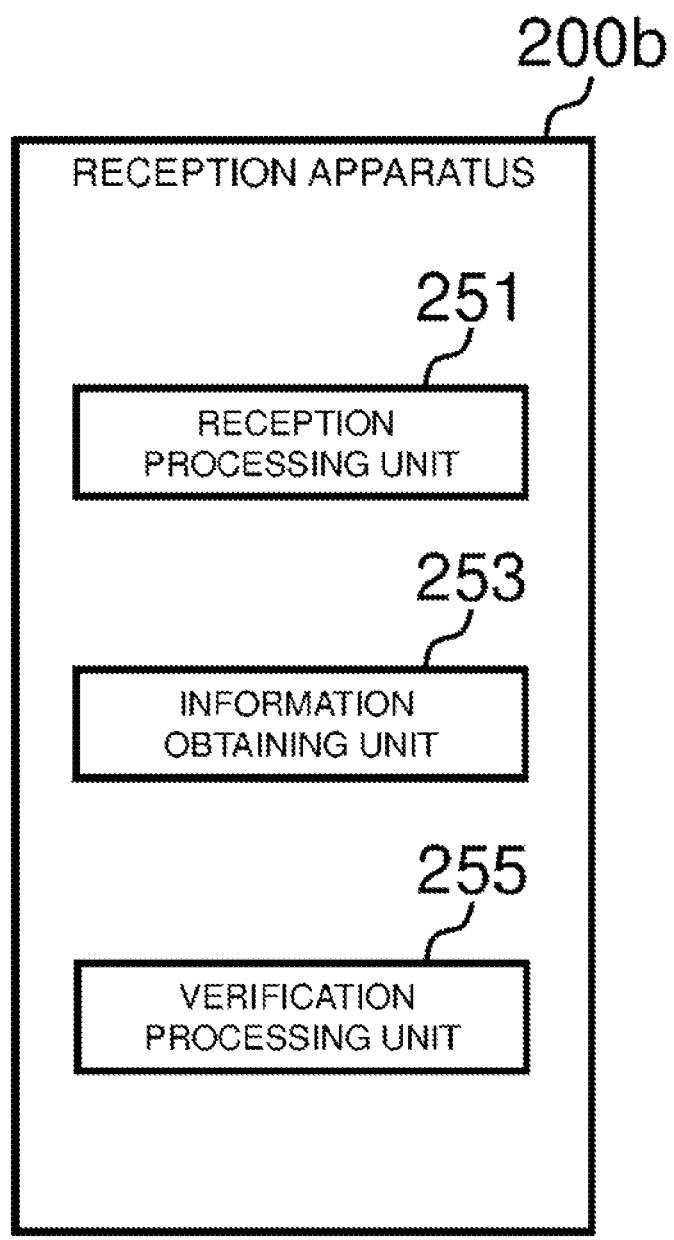
FIG. 13 is a block diagram illustrating an example of a schematic configuration of a reception apparatus 200b according to the second example embodiment.

FIG. 13 is a block diagram illustrating an example of a schematic configuration of a reception apparatus 200b according to the second example embodiment. With reference to FIG. 13, the reception apparatus 200b includes a reception processing unit 251, an information obtaining unit 253, and a verification processing unit 255.

The reception processing unit 251, the information obtaining unit 253, and the verification processing unit 255 may be implemented with one or more processors, and a memory (e.g., a nonvolatile memory and/or a volatile memory) and/or a hard disk. The reception processing unit 251, the information obtaining unit 253, and the verification processing unit 235 may be implemented with the same processor, or may be separately implemented with different processors. The memory may be included in the one or more processors or may be provided outside the one or more processors.

3.3. Operation Example

An operation example according to the second example embodiment will be described.

According to the second example embodiment, the transmission apparatus 100b (information obtaining unit 151) obtains information related to a change-prohibited region included in a container to be transmitted, information indicating that the change-prohibited region has not been changed, and information related to vulnerability inspection for the change-prohibited region. The transmission apparatus 100b (transmission processing unit 153) includes, in the container, the information related to the change-prohibited region, the information indicating that the change-prohibited region has not been changed, and the information related to the vulnerability inspection for the change-prohibited region, and transmits the container.

According to the second example embodiment, the reception apparatus 200b (reception processing unit 251) receives the container. The reception apparatus 200b (information obtaining unit 253) obtains the information related to the vulnerability inspection that is based on the information related to the change-prohibited region included in the container. The reception apparatus 200b (verification processing unit 255) performs verification processing for the container, based on the information related to the vulnerability inspection for the change-prohibited region and the information related to the vulnerability inspection that is based on the information related to the change-prohibited region included in the container.

Relationship with First Example Embodiment

As an example, the information obtaining unit 151 and the transmission processing unit 153 included in the transmission apparatus 100b according to the second example embodiment may perform operations of the information obtaining unit 131 and the transmission processing unit 133 included in the transmission apparatus 100a according to the first example embodiment, respectively. The reception processing unit 251, the information obtaining unit 253, and the verification processing unit 255 included in the reception apparatus 200a according to the second example embodiment may perform operations of the reception processing unit 231, the information obtaining unit 233, and the verification processing unit 235 included in the reception apparatus 200a according to the first example embodiment, respectively. In this case, description regarding the first example embodiment may also be applied to the second example embodiment. Note that the second example embodiment is not limited to this example.

The second example embodiment has been described above. According to the second example embodiment, information related to vulnerability that may be included in a container as a transmission target can be appropriately provided.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the information obtaining unit and/or the transmission processing unit) of the transmission apparatus described in the Specification (e.g., one or more apparatuses (or units) among a plurality of apparatuses (or units) constituting the transmission apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

An apparatus including constituent elements (e.g., the reception processing unit, the information obtaining unit, and/or the verification processing unit) of the reception apparatus described in the Specification (e.g., one or more apparatuses (or units) among a plurality of apparatuses (or units) constituting the reception apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary note 1)

A transmission apparatus comprising:

an information obtaining unit configured to obtain information related to a change-prohibited region included in a container to be transmitted, information indicating that the change-prohibited region has not been changed, and information related to vulnerability inspection for the change-prohibited region; and a transmission processing unit configured to include, in the container, the information related to the change-prohibited region, the information indicating that the change-prohibited region has not been changed, and the information related to the vulnerability inspection for the change-prohibited region, and transmit the container.

(Supplementary note 2)

The transmission apparatus according to supplementary note 1, wherein the information related to the change-prohibited region includes information for identifying a position of the change-prohibited region in the container.

(Supplementary note 3)

The transmission apparatus according to supplementary note 1 or 2, wherein the information related to the change-prohibited region includes attribute information of one or more files included in the change-prohibited region.

(Supplementary note 4)

The transmission apparatus according to supplementary note 1, wherein the information indicating that the change-prohibited region has not been changed includes a hash value generated from the information related to the change-prohibited region.

(Supplementary note 5)

The transmission apparatus according to any one of supplementary notes 1 to 4, wherein the information related to the vulnerability inspection for the change-prohibited region includes information related to an inspection tool that performs the vulnerability inspection for the change-prohibited region.

(Supplementary note 6)

The transmission apparatus according to supplementary note 5, wherein the container further includes information for executing the inspection tool.

(Supplementary note 7)

The transmission apparatus according to any one of supplementary notes 1 to 6, wherein the information related to the vulnerability inspection for the change-prohibited region includes information related to an inspection target region included in the change-prohibited region.

(Supplementary note 8)

The transmission apparatus according to any one of supplementary notes 1 to 7, wherein the information related to the vulnerability inspection for the change-prohibited region includes information indicating a configuration condition of a parameter related to vulnerability in the change-prohibited region.

(Supplementary note 9)

The transmission apparatus according to any one of supplementary notes 1 to 8, wherein before transmitting the container, the transmission processing unit transmits the information related to the change-prohibited region to a computing system that performs the vulnerability inspection via a communication network, and the transmission apparatus further comprises a reception processing unit configured to receive, before transmitting the container, the information related to the vulnerability inspection for the change-prohibited region from the computing system that performs the vulnerability inspection via the communication network.

(Supplementary note 10)

A reception apparatus comprising:

a reception processing unit configured to receive a container including information related to a change-prohibited region included in the container, information indicating that the change-prohibited region has not been changed, and information related to vulnerability inspection for the change-prohibited region;

an information obtaining unit configured to obtain information related to the vulnerability inspection that is based on the information related to the change-prohibited region included in the container; and a verification processing unit configured to perform verification processing for the container, based on the information related to the vulnerability inspection for the change-prohibited region and the information related to the vulnerability inspection that is based on the information related to the change-prohibited region included in the container.

(Supplementary note 11)

The reception apparatus according to supplementary note 10, wherein the container further includes information related to an inspection tool that performs the vulnerability inspection that is based on the information related to the change-prohibited region, and the information obtaining unit performs inspection for the information related to the change-prohibited region by using the inspection tool, and obtains the information related to the vulnerability inspection that is based on the information related to the change-prohibited region.

(Supplementary note 12)

A container transmission system comprising:

a transmission apparatus configured to transmit a container including information related to a change-prohibited region included in the container to be transmitted, information indicating that the change-prohibited region has not been changed, and information related to vulnerability inspection for the change-prohibited region; and a reception apparatus configured to receive the container, and perform verification processing for the container, based on the information related to the vulnerability inspection for the change-prohibited region and the information related to the vulnerability inspection that is based on the information related to the change-prohibited region included in the container.

(Supplementary note 13)

A method comprising:

obtaining information related to a change-prohibited region included in a container to be transmitted, information indicating that the change-prohibited region has not been changed, and information related to vulnerability inspection for the change-prohibited region; and including, in the container, the information related to the change-prohibited region, the information indicating that the change-prohibited region has not been changed, and the information related to the vulnerability inspection for the change-prohibited region, and transmitting the container.

(Supplementary note 14)

A method comprising:

receiving a container including information related to a change-prohibited region included in the container, information indicating that the change-prohibited region has not been changed, and information related to vulnerability inspection for the change-prohibited region;

obtaining information related to the vulnerability inspection that is based on the information related to the change-prohibited region included in the container; and performing verification processing for the container, based on the information related to the vulnerability inspection for the change-prohibited region and the information related to the vulnerability inspection that is based on the information related to the change-prohibited region included in the container.

(Supplementary note 15)

A method comprising:

transmitting, by a transmission apparatus, a container including information related to a change-prohibited region included in the container to be transmitted, information indicating that the change-prohibited region has not been changed, and information related to vulnerability inspection for the change-prohibited region; and receiving, by a reception apparatus, the container, and performing verification processing for the container, based on the information related to the vulnerability inspection for the change-prohibited region and the information related to the vulnerability inspection that is based on the information related to the change-prohibited region included in the container.

(Supplementary note 16)

A program for causing a computer to execute:

obtaining information related to a change-prohibited region included in a container to be transmitted, information indicating that the change-prohibited region has not been changed, and information related to vulnerability inspection for the change-prohibited region; and including, in the container, the information related to the change-prohibited region, the information indicating that the change-prohibited region has not been changed, and the information related to the vulnerability inspection for the change-prohibited region, and transmitting the container.

(Supplementary note 17)

A program for causing a computer to execute:

receiving a container including information related to a change-prohibited region included in the container, information indicating that the change-prohibited region has not been changed, and information related to vulnerability inspection for the change-prohibited region;

obtaining information related to the vulnerability inspection that is based on the information related to the change-prohibited region included in the container; and performing verification processing for the container, based on the information related to the vulnerability inspection for the change-prohibited region and the information related to the vulnerability inspection that is based on the information related to the change-prohibited region included in the container.

Industrial Applicability

In a container transmission system for transmission of a container, information related to vulnerability that may be included in a container as a transmission target can be appropriately provided.

REFERENCE SIGNS LIST

1a Container Transmission System
100a, 100b Transmission Apparatus
131,151,233,253 Information Obtaining Unit
133, 153 Transmission Processing Unit
135, 231, 251 Reception Processing Unit
200a, 200b Reception Apparatus
235, 255 Verification Processing Unit

What is claimed is:

1. A transmission apparatus comprising:
a memory storing instructions; and
one or more processors configured to execute the instructions to:
obtain information related to a region included in a container to be transmitted, the region is specified that change is prohibited, information indicating that the region has not been changed, and information related to vulnerability inspection for a reception apparatus to perform for the region; and
include, in the container, the information related to the region, the information indicating that the region has not been changed, and the information related to the vulnerability inspection for the region, and transmit the container to the reception apparatus.

2. The transmission apparatus according to claim 1, wherein
the information related to the region includes information for identifying a position of the region in the container.

3. The transmission apparatus according to claim 1, wherein
the information related to the region includes attribute information of one or more files included in the region.

4. The transmission apparatus according to claim 1, wherein
the information indicating that the region has not been changed includes a hash value generated from the information related to the region.

5. The transmission apparatus according to claim 1, wherein
the information related to the vulnerability inspection for the region includes information related to an inspection tool that performs the vulnerability inspection for the region.

6. The transmission apparatus according to claim 5, wherein
the container further includes information for executing the inspection tool.

7. The transmission apparatus according to claim 1, wherein
the information related to the vulnerability inspection for the region includes information related to an inspection target region included in the region.

8. The transmission apparatus according to claim 1, wherein
the information related to the vulnerability inspection for the region includes information indicating a configuration condition of a parameter related to vulnerability in the region.

9. The transmission apparatus according to claim 1, wherein
the one or more processors are configured to execute the instructions to:
before transmitting the container, transmit the information related to the region to a computing system that performs the vulnerability inspection via a communication network, and
receive, before transmitting the container, the information related to the vulnerability inspection for the region from the computing system that performs the vulnerability inspection via the communication network.

10. A reception apparatus comprising:
a memory storing instructions; and
one or more processors configured to execute the instructions to:
receive, from a transmission apparatus, a container including information related to a region included in the container, the region is specified that change is prohibited, information indicating that the region has not been changed, and information related to vulnerability inspection for the reception apparatus to perform for the region;
obtain information related to the vulnerability inspection that is based on the information related to the region included in the container; and
perform verification processing for the container, based on the information related to the vulnerability inspection for the region and the information related to the vulnerability inspection that is based on the information related to the region included in the container.

11. The reception apparatus according to claim 10, wherein
the container further includes information related to an inspection tool that performs the vulnerability inspection that is based on the information related to the region, and
the one or more processors are configured to execute the instructions to:
perform inspection for the information related to the region by using the inspection tool, and
obtain the information related to the vulnerability inspection that is based on the information related to the region.

12. A container transmission system comprising:
a transmission apparatus; and
a reception apparatus,
wherein the transmission apparatus comprises a memory storing instructions and one or more processors configured to execute the instructions to transmit a container including information related to a region included in the container to be transmitted, the region is specified that change is prohibited, information indicating that the region has not been changed, and information related to vulnerability inspection for the reception apparatus to perform for the region, and wherein the reception apparatus comprises a memory storing instructions and one or more processors configured to configured to execute the instructions to receive the container from the transmission apparatus, and perform verification processing for the container, based on the information related to the vulnerability inspection for the region and the information related to the vulnerability inspection that is based on the information related to the region included in the container.

13. A method performed by a transmission apparatus and comprising:

obtaining information related to a region included in a container to be transmitted, the region is specified that change is prohibited, information indicating that the region has not been changed, and information related to vulnerability inspection for a reception apparatus to perform for the region; and including, in the container, the information related to the region, the information indicating that the region has not been changed, and the information related to the vulnerability inspection for the region, and transmitting the container to the reception apparatus.

14. A method performed by a reception apparatus and comprising:

receiving, from a transmission apparatus, a container including information related to a region included in the container, the region is specified that change is prohibited, information indicating that the region has not been changed, and information related to vulnerability inspection for a reception apparatus to perform for the region;

obtaining information related to the vulnerability inspection that is based on the information related to the region included in the container; and performing verification processing for the container, based on the information related to the vulnerability inspection for the region and the information related to the vulnerability inspection that is based on the information related to the region included in the container.

* * * * *